Dec. 2, 1952      F. M. KANESKI      2,619,936
CONNECTING CLAMP DEVICE FOR TYING ANIMALS TAILS AND THE LIKE
Filed May 4, 1950

*INVENTOR.*
FRANK M. KANESKI
*BY*
Richard P. Cardow
AGENT

Patented Dec. 2, 1952

2,619,936

UNITED STATES PATENT OFFICE 2,619,936

CONNECTING CLAMP DEVICE FOR TYING ANIMALS TAILS AND THE LIKE

Frank M. Kaneski, Duluth, Minn.

Application May 4, 1950, Serial No. 159,952

4 Claims. (Cl. 119—105)

This invention relates to a method and means for securing an animal's tail so that she is not able to swing same.

During winter months, in cold climates, animals, such as cattle, must be kept in barns or other buildings. While kept in barns, the cattle are usually kept in stalls and are secured by stanchions or the like to prevent their roaming around. The stalls are usually side by side along the walls of the barn and a manure trough runs the length of the stalls and adjacent thereto to catch excreta and provide for better sanitation in the barns.

However, when a cow lies down in the stall, her tail usually contacts manure in the trough behind the stall, and when the cow swings her tail, this manure ends up on the cow's body, as well as in the stall; thus the cow and stall are made dirty because of the freedom the cow has in swinging her tail. The only useful purpose known for a cow's tail is to keep flies off of her, and there are not flies during the winter months.

Therefore, it is one of my principal objects to provide an efficient means for tying a cow's tail to prevent its use during the winter months.

Another object is to provide a means for holding a cow's tail which will not injure the cow, yet will be effective even though a cow should lie on the fastening or force it against the wall of the stall.

Another object is to provide a fastening means whereby the tail may be readily released for summer use.

A more specific object is to install a ring permanently in the loose skin of a cow's flank, and a strong clamp which connects to the ring and holds on to the hair of a cow's tail to prevent the swinging of the tail.

Other objects of my invention are to provide a self-locking clamp for connection between the said ring and tail, and to provide a clamp which is locked on both the said ring and the cow's tail with one closing operation.

Another advantage of my invention is that the tail of a cow can be held out of the way for milking even in summer by installing the clamp thereon.

These and other objects and advantages will become more apparent as the description of my invention proceeds.

In the accompanying drawing forming a part of this application:

Figure 1:
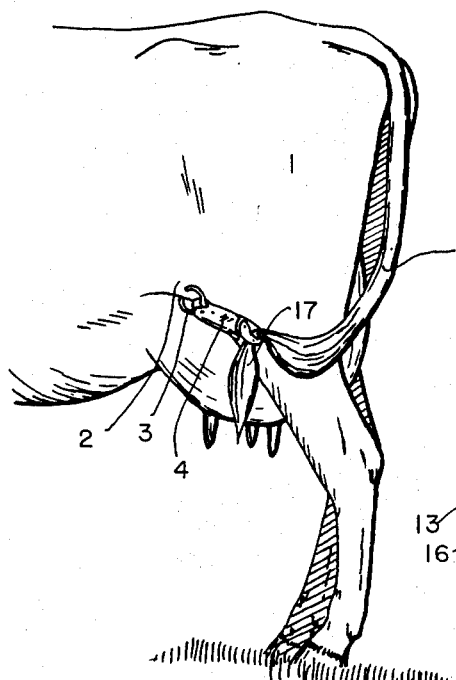
Fig. 1 is a perspective view of a portion of a cow, showing my invention installed.
Figure 2:
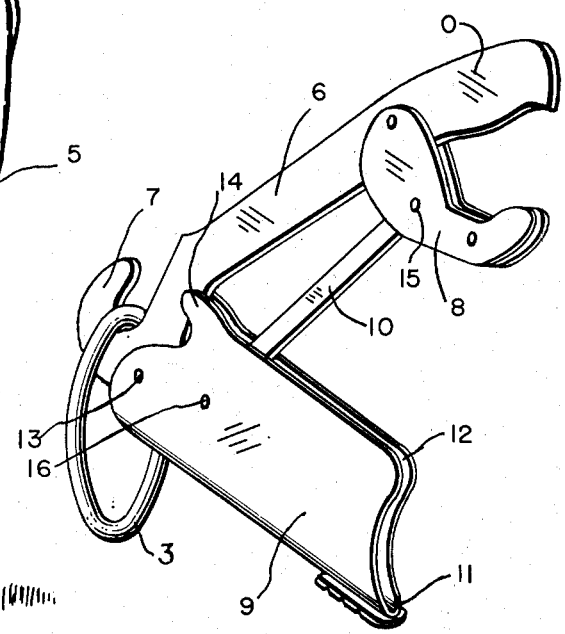
Fig. 2 is a perspective view of the tail clamp and ring in open position.

In the drawings, the reference numeral 1 indicates a cow, and 2 indicates the loose skin of the flank of a cow just forwardly of the hind leg thereof.

The loose skin 2 may be perforated by means of any suitable punch, and a split ring 3 may be permanently installed in the perforation as shown in Fig. 1. The ring may have any suitable fastening to secure the split ends of the ring together, if desired, or the ends may be soldered or spot welded together if preferred. The ring will not hurt the animal, anymore than an earring hurts a woman.

With the ring thus installed, my clamping device 4 is employed to connect the tail 5 to the ring 2 and prevent the tail from being swung.

My clamping device comprises an elongated body portion 6 which has a hook 7 formed at one end thereof and has a jaw member 0 at the opposite end thereof. A movable jaw 8 is pivotally installed adjacent the inner end of the fixed jaw 0, the latter jaw being shaped to cooperate with the fixed jaw 0. The inner and outer ends of the jaw 8 are preferably bifurcated, as shown, so that they may receive the body portion and jaw 0, respectively, therebetween and provide a more sturdy structure.

Two cooperative levers are provided to operate the jaw 8, the operating lever 9 and the connecting or locking lever 10. The lever 9 comprises, preferably, a sheet of metal doubled back upon itself centrally and longitudinally thereof, as at 11, forming a cavity 12 between the walls of the lever, as shown. The lever 9 is pivotally installed on the body portion adjacent one end thereof as at 13, and has a projection or hook-like portion 14 thereon which serves to close the open end of the hook 7 when the lever is in closed position against the body portion (see Fig. 3). Thus, the clamping device may be secured on the ring 2 by placing the hook 7 on the ring 2, then closing the lever 9 against the body portion.

The lever 10 is pivotally connected to the jaw 8, as at 15, and to the lever 9, as at 16, thus connecting the jaw to the operating lever. It is deemed apparent that the operation of the lever will readily open or close the jaws 0 and 8.

Figure 3:
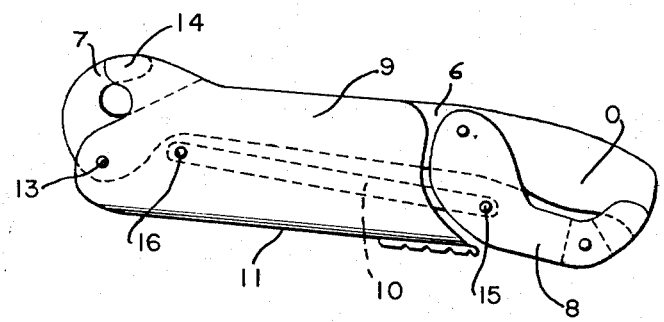
Fig. 3 is a side elevational view of the clamp.

An automatic locking feature is provided for the clamping device by placing the pivotal points 13, 16 and 15 so that the point 16 snaps past a line between the points 13 and 15 when the lever 9 is in closed position, see Fig. 3.

In operation, with the ring 2 in place on the cow's flank, the cow's tail is grasped with one hand and some of the hair 17 at the end of the tail is placed between the jaws of the clamping device, which is held in the other hand. The hook 7 is then engaged in the ring 2 and the lever 9 moved to closed position. The hair 17 is thus clamped between the jaws, and the hook 7 is closed. The levers, being locked, will prevent the tail from coming loose accidentally and will hold the tail in place without injury to the cow.

Having thus described my invention, what I claim is:

1. Means for securing the tail of a cow to remain adjacent the flank of said cow comprising: a ring adapted to be mounted in the skin of said flank, and a clamping device adapted to be carried in said ring and to grip a portion of said tail to hold the latter in place, said clamping device comprising a body portion having a jaw at one end thereof, a movable jaw pivotally connected to said body portion to cooperate with said first mentioned jaw, an operating lever pivotally connected to said body portion, a clamping lever pivotally connected between said jaw and said operating lever and operated by the latter to close said jaws and clamp said tail therebetween, a hook on the end of said body member opposite said jaw, and a projection on said operating lever to overlap said hook when said lever is in closed position to secure said body portion to said ring.

2. Means for securing the tail of a cow to remain adjacent the flank of said cow comprising: a ring adapted to be mounted in the skin of said flank, and a clamping device adapted to be carried in said ring and to grip a portion of said tail to hold the latter in place, said clamping device comprising a body portion having a jaw at one end thereof, a movable jaw pivotally connected to said body portion to cooperate with said first mentioned jaw, a lever arrangement to close said jaws and clamp said tail therebetween, a hook at the end of said body portion opposite said jaw, said hook being engageable in said ring, and means on said lever arrangement adjacent said hook for closing said hook when said levers are in position closing said jaws.

3. Means to secure a cow's tail from swinging comprising a clamping device adapted to be secured to a portion of said cow's body and to grip a portion of said tail to hold the latter closely adjacent said cow's body, said clamping device comprising a body portion having a jaw at one end thereof, a movable jaw pivotally connected to said body portion to cooperate with said first mentioned jaw, a lever arrangement to close said jaws and clamp said tail therebetween, a hook at the end of said body opposite said jaw, a projection on said lever arrangement adapted to extend over the end of the hook to close same when said jaws are closed and to open same when said jaws are open, said hook serving to secure said clamping device to said cow's body.

4. Means to secure the tail of a cow from swinging comprising a clamping device, said clamping device comprising a body portion having a jaw at one end thereof, a movable jaw pivotally connected to said body portion to cooperate with said first mentioned jaw to hold said tail therebetween, an operating lever pivotally connected to said body portion, a clamping lever pivotally connected between said movable jaw and said operating lever and operated by the latter to close said jaws and clamp said tail therebetween, and means at the end of said body portion opposite said jaws to secure said clamping device to a portion of said cow, said means comprising a hook at the end of said body portion opposite said jaw, said hook being engageable with a ring secured on a portion of a cow, and a projection on said operating lever to close said hook when said jaws are closed and to open said hook when said jaws are open.

FRANK M. KANESKI.

REFERENCES CITED

The following references are of record in the file of this patent:

UNITED STATES PATENTS

| Number | Name | Date |
|---|---|---|
| 1,006,109 | Malmstrom | Oct. 17, 1911 |
| 1,141,746 | Zenke | June 1, 1915 |
| 1,192,390 | Corbin | July 25, 1916 |
| 2,053,388 | Abell | Sept. 8, 1936 |